UNITED STATES PATENT OFFICE.

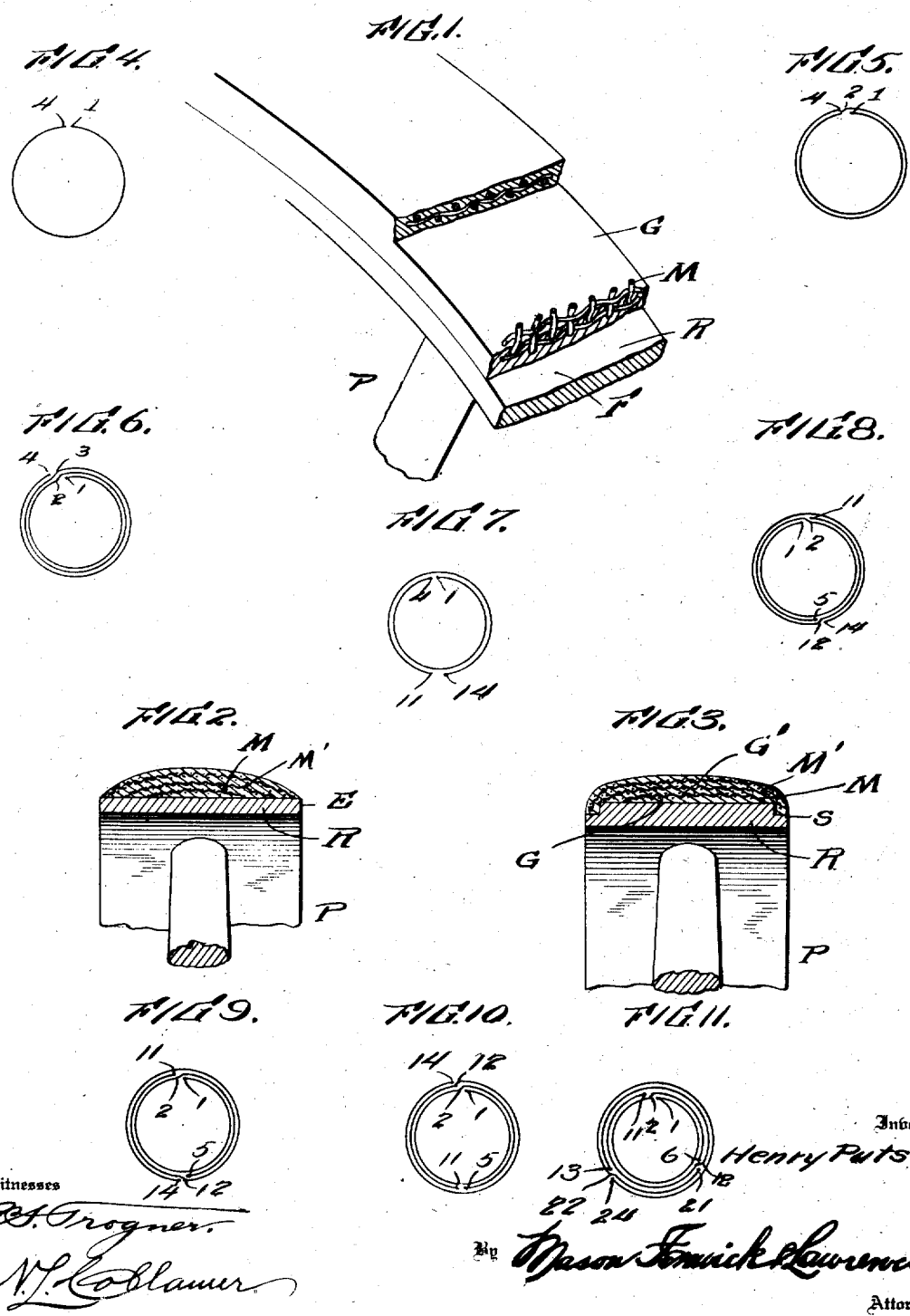

HENRY PUTSCH, OF CHICAGO, ILLINOIS, ASSIGNOR TO POWER GLUE MANUFACTURING COMPANY, OF CHICAGO, ILLINOIS, A CORPORATION.

PULLEY-RIM COVERING.

1,257,530.  Specification of Letters Patent.  Patented Feb. 26, 1918.

Application filed September 13, 1915. Serial No. 50,479.

*To all whom it may concern:*

Be it known that I, HENRY PUTSCH, a subject of the Emperor of Germany, residing at Chicago, in the county of Cook and State of Illinois, have invented certain new and useful Improvements in Pulley-Rim Coverings; and I do hereby declare the following to be a full, clear, and exact description of the invention, such as will enable others skilled in the art to which it appertains to make and use the same.

This invention relates to pulleys, and more especially to the rim coverings therefor; and the object of the same is to provide a coating for the rims or surfaces of wheels or drums, fly wheels, or pulleys carrying belts which will prevent the sliding and slipping of the belt thereon and therefore increase the power, and which will prolong the life of the belt. This object has heretofore been attained in a certain measure by coating the face of the pulley rim with various compositions and sometimes by applying strips to said face, but the gist of the present invention lies in covering said face with a coating of plastic material which is reinforced by an embedded netting of coarse mesh. Details of the invention and the manner of applying its layers of plastic and netting are set forth in the following specification and shown in the drawings wherein:

Figure 1 is a perspective view of a portion of a pulley rim covered with a two-ply coating according to my invention, the layers of the coating being shown in section on different lines and the netting of one layer being up-turned to illustrate its construction.

Fig. 2 is a cross section of a flat pulley rim which is crowned by the use of my covering, and Fig. 3 is a cross section of a special form of pulley rim described below.

The remaining views are small diagrams showing several ways in which the strips of netting may be wound as they are applied.

In the drawings the letter P designates a pulley having a rim R whose face F is usually flat transversely as shown in Fig. 1, and to this face my covering is applied, either when the pulley is made or subsequently. The covering comprises a layer G of plastic, such as glue compounded with silicates mechanically mixed with dextrin; and embedded in this plastic a layer M of open-work netting such as wire cloth, asbestos, vegetable fiber, or even coarse cheesecloth or muslin. The netting is wholly embedded in the plastic as by being applied thereon before the plastic has set, and the layers are repeated if desired. A distinction is made between fabrics of coarse mesh such as canvas which has been heretofore employed for this purpose, and fabrics of open mesh which I use. Coarse mesh might imply a fabric whose warp and weft were of coarse strands or were loosely woven together: by "open mesh" I mean a fabric so woven that there are clear openings between its strands as best seen in Fig. 1 where the netting M is turned up. Also the netting is embedded within the layer of plastic so that it serves as a reinforce therefor and no part of any of its meshes appears on the exterior, at least, when the covering of the pulley is new. It results that the belt comes in contact only with the outermost layer of plastic which must therefore be of a composition possessing a suitable "cling" and which is not unduly susceptible to wear or heat. The exact ingredients of this composition form no part of the present invention, nor is the manner in which the covering is applied to the rim essential; but in order that the treated pulley shall be strictly round I prefer that each layer pass completely around the wheel and that the several convolutions of the netting, if there are several, shall break joint with each other so that at all points around the circumference of the rim there shall be an equal number of the layers or strips of netting.

Figs. 2 and 3 illustrate how the face of the rim may be arched or crowned transversely by the application of this covering. Assuming that such face is flat as shown in Fig. 2, I would apply the inner layer G of plastic direct to a strip along the transverse center of this face, then lay the inner strip M of netting over said layer of plastic while the layer was still soft and draw it tight so that it sinks into the same and is more or less completely embedded; then I would apply the next layer G' of plastic over the first reinforced layer, and have it slightly wider as shown, and over this I would apply the next strip M' of netting, this second reinforced layer reaching either completely to the edges E of the rim as shown, or only part way to such edges if there is to be a subsequent layer which need not be described. In this manner the various layers grow successively wider and wider, the narrower ones acting as supports for the transverse center of the wider ones, and finally the outermost layer is arched or crowned as shown, and the desired contour is given to the face of the treated pulley.

In Fig. 3 the rim may or may not be flat on its face, but at its sides it is provided with shoulders as indicated at S. My improved covering may be applied in the manner already described if the face is flat, or it may be applied in an equal number of layers all over the face if the latter itself be arched; but in this instance the outermost layer, or layers, are carried over the edges of the rim and down into the shoulders as shown.

If the plastic material be such that it has any tendency to yield, or whenever it becomes worn or thin, it is undesirable that any strip of the netting should be carried around it and the ends of the strip lapped, because such lap would produce a spot in the plastic which was harder than elsewhere and which would naturally suffer most from wear. Accordingly I prefer that every strip break joint with every other, or if but a single strip of netting be employed its ends shall be brought to and quite into contact but without being lapped. The netting may be in a single strip given several convolutions, and the layers of plastic applied between them; or the netting may be in a plurality of strips applied independently. The simplest form is shown in Fig. 4 where the netting is a strip making a single convolution, beginning at 1 and passing around the plastic as above described, and terminating at 4 near the point 1 but without the ends of the strip overlapping each other. This would be used where the coating is but one layer of plastic thus reinforced with one strip of netting. In Fig. 5 the netting begins at the point 1 and makes one complete convolution to the point 2, and then it is carried out over the inner end 1 and makes another convolution, and its outer end 4 terminates over the point 2 but does not lap the inner end. This netting would probably be employed where there are two layers of plastic, although obviously the plastic might be thicker and a two-ply netting embedded in it. In Fig. 6 a single strip begins at 1 and makes a convolution, is then carried outward at 2 and makes a second convolution, is then carried out at 3 and makes a third convolution, and terminates at 4. Fig. 7 shows perhaps the simplest manner of winding two separate strips, one beginning at 1 and ending at 4 and the other beginning at 11 and ending at 14 so that the ends of the two strips break joint with each other and stand preferably at opposite sides of the pulley. The remaining views show other windings employing a plurality of strips, but the same idea prevails. The open mesh of the netting permits the plastic to ooze through the same if the netting is applied before the plastic has set, and this is true whether the netting is in one strip or more than one and is in one convolution or more than one. While a strip of wire netting might be stretched along its center for the purpose of crowning the periphery of the wheel, it will be obvious that nettings of other material are better adapted to this use.

What I claim is:

1. A pulley having on its face a coating comprising a body of adhesive, plastic material applied thereto, with an open-meshed, reinforcing fabric embedded entirely within such material, whereby the adhesive material forms a coating on each side of the fabric and is bonded together between the meshes of such fabric.

2. A pulley having on its face a coating comprising a body of adhesive plastic material applied thereto, with layers of an open-meshed, reinforcing fabric embedded entirely within such material whereby the material forms a coating on each side of each layer of fabric and the respective coatings are bonded together between the meshes of each interposed layer of fabric.

3. A pulley having on its face a coating comprising a body of hardened, viscous and adhesive material applied thereto, with an open-meshed, reinforcing fabric embedded entirely within such material, whereby the viscous material forms an adhesive coating on each side of the fabric, adhering to the pulley face and bonded together between the meshes of the fabric.

4. A pulley having on its face a coating comprising a body of hardened, viscous and adhesive material applied thereto, with layers of an open-meshed, reinforcing fabric embedded entirely within such material, whereby the viscous material forms an adhesive coating on each side of each layer of fabric, the innermost coating adhering to the pulley face, and the respective coatings being bonded together between the meshes of each interposed layer of fabric.

In testimony whereof I affix my signature in presence of two witnesses.

HENRY PUTSCH.

Witnesses:
DANIEL R. FORBES,
EVELYN C. GREENE.